(12) United States Patent
Oishi et al.

(10) Patent No.: US 11,907,425 B2
(45) Date of Patent: Feb. 20, 2024

(54) IMAGE PROCESSING DEVICE, IMAGE PROCESSING METHOD, AND IMAGE PROCESSING PROGRAM

(71) Applicant: NIPPON TELEGRAPH AND TELEPHONE CORPORATION, Tokyo (JP)

(72) Inventors: Yasunori Oishi, Tokyo (JP); Hiroaki Gomi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 426 days.

(21) Appl. No.: 17/421,695

(22) PCT Filed: Jan. 6, 2020

(86) PCT No.: PCT/JP2020/000024
§ 371 (c)(1),
(2) Date: Jul. 8, 2021

(87) PCT Pub. No.: WO2020/145224
PCT Pub. Date: Jul. 16, 2020

(65) Prior Publication Data
US 2022/0091676 A1 Mar. 24, 2022

(30) Foreign Application Priority Data
Jan. 9, 2019 (JP) .................. 2019-002096

(51) Int. Cl.
*G06F 3/01* (2006.01)
*G06T 7/215* (2017.01)
*G06V 20/40* (2022.01)
*G06V 10/764* (2022.01)

(52) U.S. Cl.
CPC ............. *G06F 3/016* (2013.01); *G06T 7/215* (2017.01); *G06V 10/764* (2022.01); *G06V 20/41* (2022.01)

(58) Field of Classification Search
CPC ......... G06F 3/016; G06T 7/215; G06V 20/41; G06V 10/764
See application file for complete search history.

(56) References Cited

U.S. PATENT DOCUMENTS

2015/0109528 A1 4/2015 Choi et al.

FOREIGN PATENT DOCUMENTS

| JP | 2010171798 A | 8/2010 |
| JP | 2017063916 A | 4/2017 |

*Primary Examiner* — Mark Roz

(57) ABSTRACT

To implement a video processing device, a video processing method, and a video processing program capable of estimating a movement vector from a video content and providing processing information based on the movement vector to a haptic device or other force sense presentation devices, a video processing device according to the present disclosure includes a scene identification unit to estimate scene class information that is information identifying a scene class for a video content and a plurality of movement information estimation units to estimate a movement vector from the video content. One movement information estimation unit that is selected from the plurality of movement information estimation units in response to the scene class identified by the scene class information estimates the movement vector.

9 Claims, 8 Drawing Sheets

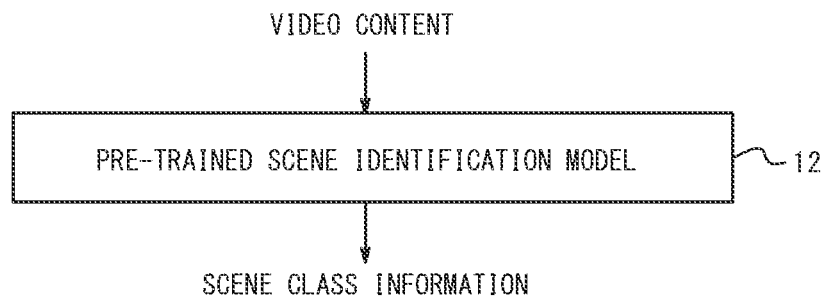
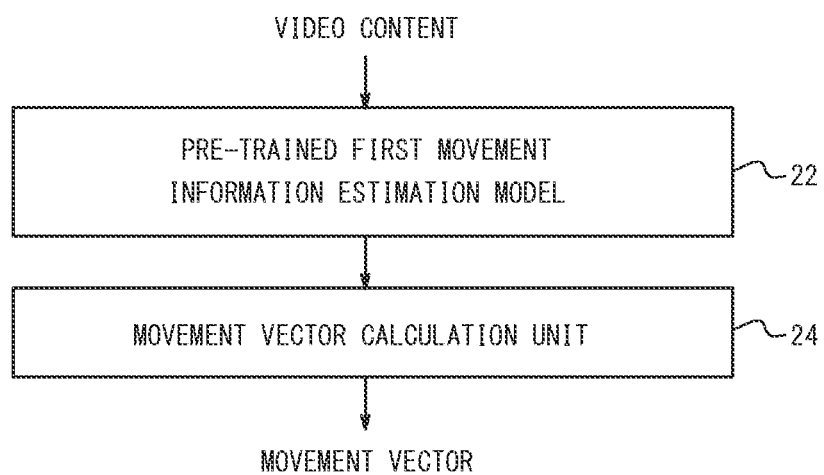

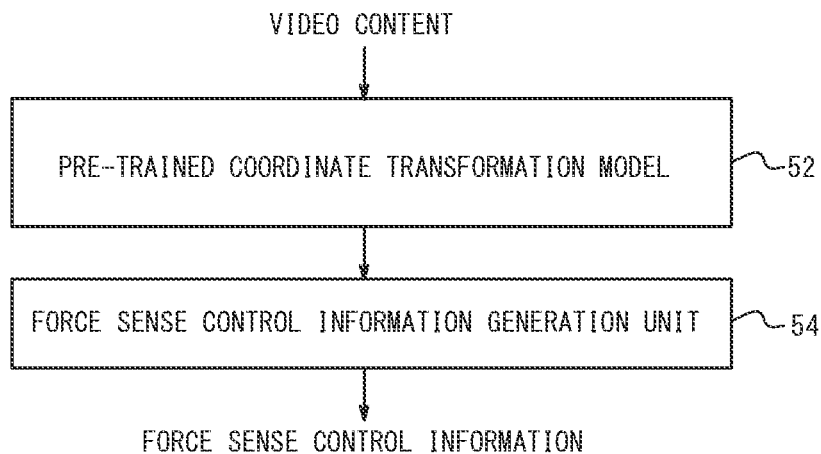
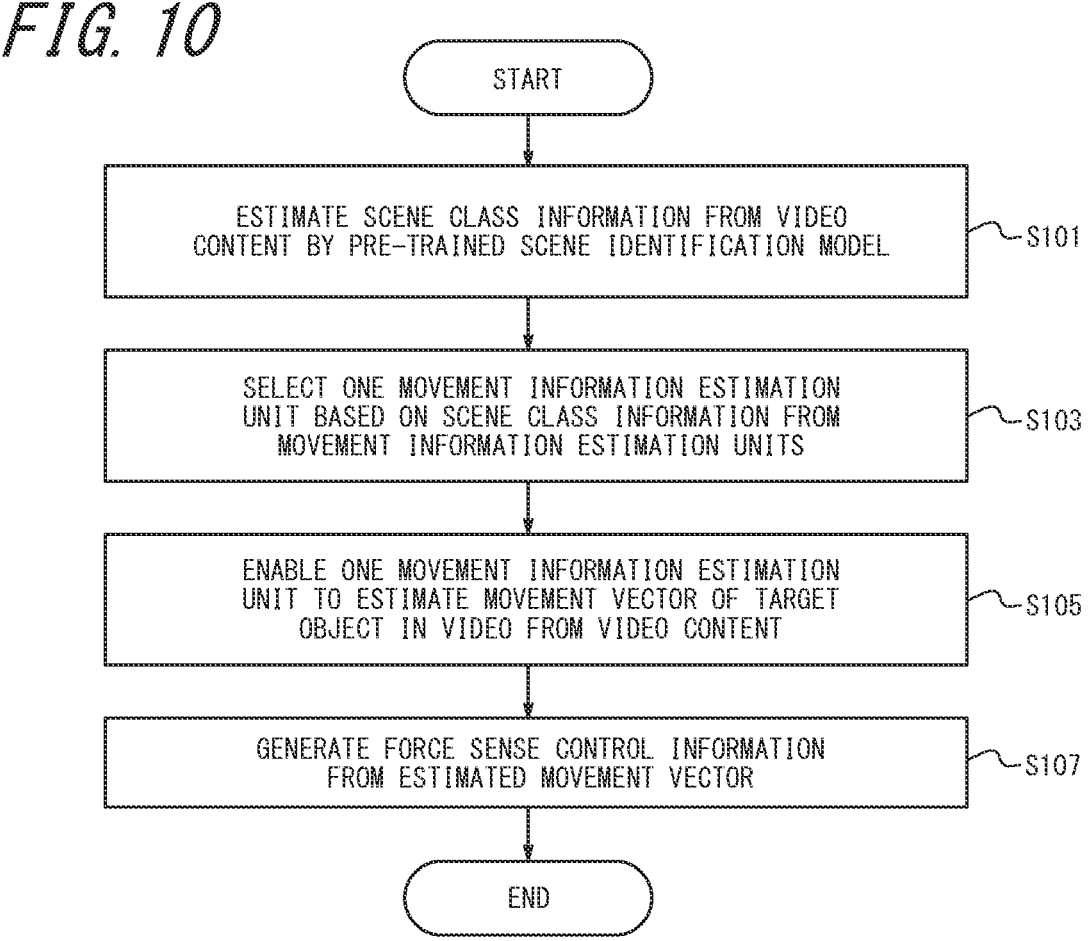

IMAGE PROCESSING DEVICE, IMAGE PROCESSING METHOD, AND IMAGE PROCESSING PROGRAM

CROSS-REFERENCE TO RELATED APPLICATIONS

This application is a U.S. 371 Application of International Patent Application No. PCT/JP2020/000024, filed on 6 Jan. 2020, which application claims priority to and the benefit of JP Application No. 2019-002096, filed on 9 Jan. 2019, the disclosures of which are hereby incorporated herein by reference in their entireties.

TECHNICAL FIELD

The present disclosure relates to a video processing device, a video processing method, and a video processing program capable of estimating a movement vector from a video content and providing processing information to a haptic device or other force sense presentation devices.

BACKGROUND ART

In recent years, technologies have been developed to enable users to have a more real virtual experience by synchronizing a video content with a force sense given by a haptic device and presenting the synchronized force sense. Patent Literature 1, for example, discloses a technique for presenting tractive force of a predetermined direction and a magnitude to a pseudo-haptic device in response to a relative distance between the pseudo-haptic device held by a user and a video content.

CITATION LIST

Patent Literature

Patent Literature 1: Japanese Patent Laid-Open No. 2017-63916

SUMMARY OF THE INVENTION

Technical Problem

The technique in Patent Literature 1 enables generation of force sense information and a video content corresponding to the information based on a predetermined internal model. Meanwhile, in addition to a need for generation of a video content and force sense information in response to progress of a game as shown in Patent Literature 1, there may be a need for generation of force sense information for a video content that is present in advance to implement an application that enables a user to have a real virtual experience. However, the technique described in Patent Literature 1 is unable to generate force sense information from a video content.

An object of the present disclosure, which has been made in view of the problem described above, is to implement a video processing device, a video processing method, and a video processing program capable of estimating a movement vector from a video content and providing processing information based on the movement vector to a haptic device or other force sense presentation devices.

Means for Solving the Problem

A video processing device according to the present disclosure, accomplished to solve the problem, is a video processing device that generates a movement vector for a video content, the video processing device including:

a scene identification unit to estimate scene class information from the video content, the scene class information being information identifying a scene class for the video content; and a plurality of movement information estimation units to estimate a movement vector from the video content, wherein one movement information estimation unit that is selected from the plurality of movement information estimation units in response to the scene class identified by the scene class information estimates the movement vector.

A video processing method according to the present disclosure, accomplished to solve the problem, includes the steps of:

estimating scene class information that is information identifying a scene class for a video content;

selecting one movement information estimation unit based on the estimated scene class information from a plurality of movement information estimation units; and enabling the one movement information estimation unit to estimate a movement vector from the video content.

A video processing program according to the present disclosure, accomplished to solve the problem, is a program allowing a computer to function as the video processing device described above.

Effects of the Invention

The technique according to the present disclosure can implement a video processing device, a video processing method, and a video processing program capable of estimating a movement vector from a video content and providing processing information based on the movement vector to a haptic device or other force sense presentation devices.

BRIEF DESCRIPTION OF DRAWINGS

FIG. 2 is a block diagram illustrating a configuration of a scene identification unit in FIG. 1.

FIG. 3 is a block diagram illustrating a configuration of a first movement information estimation unit in FIG. 1.

FIG. 9 is a block diagram illustrating a configuration of a force sense information generation unit in FIG. 1.

FIG. 10 is a flowchart illustrating a process involved in a video processing method according to the first embodiment of the present disclosure.

DESCRIPTION OF EMBODIMENTS

A video processing device 100 according to a first embodiment of the present disclosure will now be described with reference to the drawings.

Figure 1:
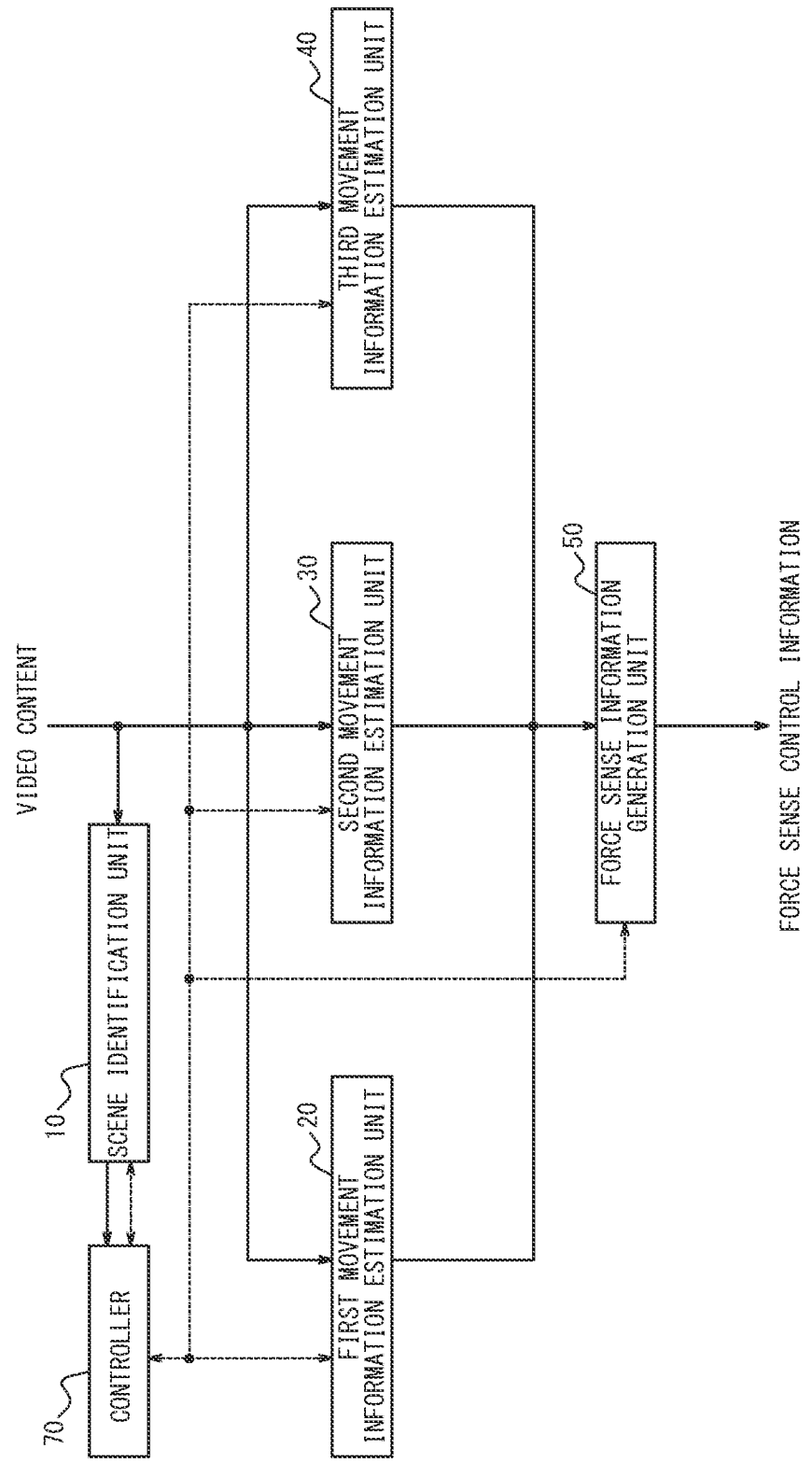
FIG. 1 is a block diagram illustrating a configuration of a video processing device according to a first embodiment of the present disclosure.

As shown in FIG. 1, the video processing device 100 according to the present embodiment includes a scene identification unit 10 to estimate scene class information that is information for identifying a scene in an input video content, a first movement information estimation unit 20, a second movement information estimation unit 30, and a third movement information estimation unit 40 to estimate a movement vector of a target object in a video from the video content, a force sense information generation unit 50 to generate force sense control information from the estimated movement vector to drive a haptic device, and a controller 70 to control the functional units described above. In FIG. 1, dashed-line arrows show an exchange of control information between the controller 70 and the other functional units.

As shown in FIG. 2, the scene identification unit 10 according to the present embodiment includes a pre-trained scene identification model 12 to output scene class information in response to input on a video content. The pre-trained scene identification model 12 is a model that is configured to output a scene class result estimated for the video content when the video content is input and that has learned such information by machine learning in advance.

The scene class information is information used to uniquely identify a class (a category) for a scene in a video content and is, for example, a name of a scene class and identification (ID) of a scene class.

The scene class is a category defined in accordance with at least any one of properties of a video content, such as a viewpoint of filming the video content, presence or absence of a specific target object in the video content, and a genre of the video content. A movement can be extracted from a video content with a high degree of precision if a region focused on during extraction of the movement or a technique for detecting the movement is varied depending on presence or absence of a specific target object in the video content or the viewpoint of filming the video. Thus, a plurality of scene classes are set in advance based on properties of video contents relevant to focused regions or movement detection techniques. In one example, the properties of video contents relevant to focused regions or movement detection techniques are a viewpoint of filming the video content, presence or absence of a specific target object (or a number of specific target objects) in the video, and a genre of the video content.

Conceivable information identifying the viewpoint of filming the video content is, for example, a "first-person viewpoint video" filmed with a camera attached to a head of a user who is enjoying cycling, waling, skiing, snowboarding, hang gliding or other activities or filmed with an event data recorder or similar devices and a "bird's-eye view video" filmed about a moving object together with a surrounding scene. If the video is a first-person video, a movement of the entire video (i.e., a movement of the camera) correlates with a movement physically experienced by the photographer. Thus, it is preferred that information on movement be extracted from the entire video to send feedback on the movement as force sense information. Meanwhile, if the video is a bird's-eye view video, it is preferable to send feedback on the movement of the target object in the video content because doing so matches a viewer's intuition. In other words, information on the viewpoint of filming the video content is a property related to the region focused on during extraction of the movement from the video content.

Conceivable information identifying presence or absence of the specific target object or the number of the specific target objects is, for example, "presence of person" that represents existence of a person in the video, "absence of person" that represents nonexistence of a person in the video, and "one person" and "a plurality of persons" that represent the number of persons in the video if persons are used as the specific target object.

A general technique used to estimate a movement of the person in the video is to estimate a skeletal structure of the person and calculate a movement vector from coordinates of the skeletal structure. Meanwhile, if a target object like a person whose skeletal structure can be estimated is absent in the video, it is necessary to calculate a movement vector by another technique such as object tracking. In other words, the presence or absence of the person in the video is a property of the video content that is related to the technique for detecting the movement from the video content.

On condition that a process such as averaging movement vectors of a plurality of persons or focusing on any one of the plurality of the persons is necessary when the plurality of the persons are present in the video, the number of the persons (either of "one person" and "a plurality of persons") is a property of the video content related to the technique for detecting the movement from the video content. Thus, it is thinkable that the video content is categorized into any of "absence of person", "one person", and "a plurality of persons".

The video content categorized into "presence of person" described herein is a video that allows estimation of the skeletal structure of a person contained in the video to calculate the movement vector of the person (coordinates of the skeletal structure) and output a representative value of the movement vector as a movement vector for the video content. Thus, the video content categorized into "presence of person" is, as a rule, a video in which a person is moving for at least one section of time.

Although "persons" are specified in the example described above, the specific target object is not limited to persons but may be any target object that allows estimation of coordinates of its skeletal structure other than persons. For instance, target objects except persons, such as moving robots, animals and cartoon characters appearing in game contents, that allow representation of their movement in time-series data about coordinates of their skeletal structure are applicable to the "specific target object" that allows estimation of coordinates of its skeletal structure.

Information identifying the genre of the video content is, for example, information representing items of sports such as "soccer", "baseball", "table tennis", and "fencing" as well as information representing types of conveyances that a person is riding in a first-person video, such as "bicycle", "automobile", "train", and "airplane". The target object and movement contained in the video has a characteristic depending on the genre. Thus, information on movement can be extracted by a technique in accordance with any of such characteristics. In other words, information on the genre is also an example of a property of the video content that is related to the region to be focused on and the technique for detecting the movement from the video content.

As described above, a plurality of scene classes are defined in advance in accordance with properties of video contents that are related to regions to be focused on and techniques used for movement detection during extraction of movements from the video contents. Then, training data that is an assemblage of data made up of sets of video contents and the labeled scene classes is prepared to train the scene identification model 12 using the training data and be ready to estimate a scene class in response to an input video content.

The pre-trained scene identification model 12 is a classifier that is designed to classify input data into a class and that can be prepared beforehand using a commonly known learning method for classifiers or other techniques. For instance, the model can be implemented by a technique such as a neural network as well as a support-vector machine (SVM) as described in Reference Literature 1.

(Reference Literature 1) D. Oneata, J. Verbeek, and C. Schmid, "Action and Event Recognition with Fisher Vectors on a Compact Feature Set", Proc. ICCV (2013)

If a neural network is used, the model can be prepared using, for example, the following method. Feature vectors corresponding to video contents in the training data are input in a neural network that is provided in advance with an appropriate initial value to obtain estimated results of scene class information that are output from the neural network. To cause the estimated results to approach information on the labeled scene classes, parameters in the neural network are repeatedly updated using a commonly known back propagation method or other techniques. Until a predetermined condition is satisfied, the parameters are repeatedly updated to obtain the neural network in which the parameters are set to final values as a pre-trained scene identification model 12. In other words, the pre-trained scene identification model 12 is a model that has learned a relationship between video contents and scene classes and that is configured to convert input on a video content to scene class information corresponding to the video content and output the scene class information.

The video processing device 100 includes the movement information estimation units 20, 30, and 40 corresponding to scene classes for input video contents. In the present embodiment, the scene identification unit 10 classifies video contents into three classes ranging from a first scene class to a third scene class described later, and the video processing device that includes the three movement information estimation units 20, 30, and 40 corresponding to the respective scene classes, for example, will be described in detail. However, the scope of the present disclosure is not limited to this mode and the number of the scene classes may be any greater than or equal to 2.

In the present embodiment, the scene identification unit 10 puts a video content into the pre-trained scene identification model 12 and thereby obtains an estimated result of scene class information output from the model and outputs the estimated scene class information. The output scene class information is information identifying any one of three scene classes, i.e., the first scene class: presence of person in bird's-eye view video, the second scene class: absence of person in bird's-eye view video, and the third scene class: first-person video.

The video processing device 100 includes the three movement information estimation units 20, 30, and 40 corresponding to the scene classes that can be identified by the scene identification unit 10. More specifically, the video processing device includes the first movement information estimation unit 20 to estimate movement information from an input video content classified into the first scene class described above, the second movement information estimation unit 30 to estimate movement information from an input video content classified into the second scene class, and the third movement information estimation unit 40 to estimate movement information from an input video content classified into the third scene class. In response to a result identified by the scene identification unit 10, the video content is input into any one of the movement information estimation units to estimate a movement vector from the video content.

Video contents can be distributed to the movement information estimation units 20, 30, and 40 by the controller 70, which, in response to a scene class determination result output from the scene identification unit 10, allows the movement information estimation unit corresponding to the scene class to process the video content, for example. However, the scope of the present disclosure is not limited to this mode. The movement information estimation units 20, 30, and 40 may be configured to obtain information on scene class from the scene identification unit 10 so that any one of the movement information estimation units 20, 30, and 40 corresponding to the scene class processes the video content.

A reason for providing the first scene class to the third scene class as scene classes in the present embodiment will now be described.

If the video content is a bird's-eye view video, presenting a force sense in response to the movement of a target object in the bird's-eye view video rather than the movement of a camera filming the video is presumably more suited to giving the user a real experience. For example, if the video content contains a video about an aquatic boat sailing on the sea, it is preferable to present a force sense in response to movement of the aquatic boat. If the video content contains a video about an automobile running on a road, it is preferable to present a force sense in response to movement of the automobile. Meanwhile, if the video content is a first-person video, movement of a camera filming the video is exactly movement of a viewpoint of the user. Thus, it is presumed that presenting a force sense in response to the movement of the camera is more suited to giving the user a real experience. Consequently, for a bird's-eye view video, it is preferable to extract a movement vector from a specific region in the video, i.e., a region covering a moving target object and a vicinity of the target object. For a first-person video, it is preferable to extract a movement vector from the entire video in response to the movement of the camera. In this way, regions focused on in the videos to extract a movement vector for giving the user a real experience are different between the bird's-eye view video and the first-person video. Thus, models used to estimate the movement vector desirably differ to estimate the movement vector in the different regions that agree more with respective regions to be focused on.

Similarly, if a specific target object such as a person whose movement can be represented by coordinates of its skeletal structure is present in a bird's-eye view video, the movement of the person can be detected with a high degree of precision by using a commonly known technique for estimating coordinates of a skeletal structure of a person in a video. This enables estimation of a movement vector suited to giving the user a real experience. Meanwhile, if the above-described specific target object is not present in another bird's-eye view video, the technique for estimating coordinates of the skeletal structure cannot be used. This necessitates estimating information on movement by another technique. In other words, the techniques for estimating the movement vector of the target object are different between the bird's-eye view videos, one of which contains and the other of which does not contains a specific target object whose movement can be represented by coordinates of its skeletal structure. Thus, the video processing device includes the individual movement information estimation units for the bird's-eye view videos to estimate the movement vector with improved precision.

To extract a movement vector from a video that does not contain a person, the movement vector is estimated using a moving target object (hereinafter also referred to as an "other target object") that cannot be estimated by skeletal structure in the video. The other target object may be detected by an object detection technique or other approaches. The other target object selected from the video is preferably a target object that is apart from the specific target object described above and that moves greatly or is likely to attract great attention. The user viewing the video is highly likely to pay attention to such a target object and thus it is presumably appropriate to use the movement vector of a target object that is apt to attract the user's attention as a movement vector that is fundamental for presenting a force sense to the user.

Scene classes into which video contents are classified are not limited to the three types described above. Video contents may be classified into a plurality of scene classes depending on methods for extracting information (movement vector) used to present a force sense to the user, i.e., in which regions in videos movement is focused on, and a plurality of movement information estimation units corresponding to the scene classes may be provided.

An increase in the number of scene classes increases the number of movement information estimation units while enabling estimation of a movement vector suited more to the scene with a high degree of precision. This, however, results in a complicated processing device. The scene classes of three types described above are representative categories that require particularly the movement information estimation units to execute different processes and are effective in enabling the small number of the movement information estimation units to estimate the movement vector from every possible video content with a certain degree of precision.

Next, operation of the first movement information estimation unit 20, which is configured to estimate a movement vector of a target object from a video content classified into the first scene class, will be described in detail.

When a scene class based on scene class information output from the scene identification unit 10 is classified into the first scene class (presence of person in bird's-eye view video), the first movement information estimation unit 20 estimates time-series data about coordinates of the skeletal structure of a person contained in an input video content to calculate a movement vector of the person. As shown in FIG. 3, the first movement information estimation unit 20 according to the present embodiment includes a pre-trained first movement information estimation model 22 to output time-series data about coordinates of the skeletal structure of a person contained in a video content of the first scene class in response to input on the video content and a movement vector calculation unit 24 to calculate a movement vector of the person from the time-series data about coordinates of the skeletal structure of the person. The pre-trained first movement information estimation model 22 is a model configured to output coordinates of the skeletal structure of a person contained in a video content in response to input on the video content and can be implemented by a technique such as a neural network. Training data that is an assemblage of pairs of video contents of the first scene class for learning and coordinates of skeletal structures of persons (correct-answer data) for learning contained in the video contents is prepared in advance to let the model learn the training data by inputting the video contents in the training data into a neural network in which an appropriate initial value is set and repeatedly updating parameters in the neural network such that estimated values of coordinates of skeletal structures output from the neural network approach the correct answer in the training data. The pre-trained first movement information estimation model 22 may be a "person pose estimation device" used to estimate a skeletal structure (a pose) of a person in a video content as described, for example, in Reference Literature 2.

(Reference Literature 2) Z. Cao, T. Simon, S. E. Wei and Y. Sheikh, "Realtime Multi-Person 2D Pose Estimation using Part Affinity Fields", Proc. CVPR (2017)

The coordinates of the skeletal structure may represent coordinates to locate one point for every person or may represent coordinates to locate a plurality of points for every person. For instance, the technique in Reference Literature 2 enables determination of coordinates of the skeletal structure to locate 10 or more points for every person, and the model may be configured to output coordinates of the skeletal structure for all these points or be configured to output a representative value (e.g., an average) of coordinates of the skeletal structure for these points. Alternatively, in accordance with a force sense desired to be presented to the user, the model may output an assemblage of coordinates of the skeletal structure corresponding to predetermined sites (e.g., a hand and a foot) of the person or a representative value of the coordinates of the skeletal structure.

The movement vector calculation unit 24 of the first movement information estimation unit 20 calculates movement vectors for coordinates of the skeletal structure using time-series data about the coordinates of the skeletal structure output from the pre-trained first movement information estimation model 22. The movement vector calculation unit 24 outputs a representative value (e.g., an average or a maximum value) of the determined movement vectors for the coordinates of the skeletal structure as a movement vector for the video content.

When calculating movement vectors from coordinates of the skeletal structure, the calculation unit calculates movement vectors between image flames from time-series data about the coordinates of the skeletal structure of each person. When data about coordinates of the skeletal structure for a plurality of points is obtained for each person, the calculation unit calculates movement vectors between image flames from data about the coordinates of the skeletal structure for the respective points and outputs a representative value of the movement vectors as a movement vector of the person.

When a plurality of persons are present in a video content of the first scene class, the controller selects one of movement vectors determined for the respective persons and lets the first movement information estimation unit 20 output the selected movement vector. Examples of methods for selecting the movement vector include (1) selecting a largest movement vector, (2) selecting a movement vector of a person selected over the video content by an input device (e.g., a mouse), and (3) moving a haptic device or another similar device in accordance with movement of a person the user wants to select and thereby selecting a movement vector of the person that agrees in high degree with a movement vector corresponding to the movement of the haptic device input from the haptic device. The controller may be configured to select a person to whom the user is likely to pay great attention.

Figure 4:
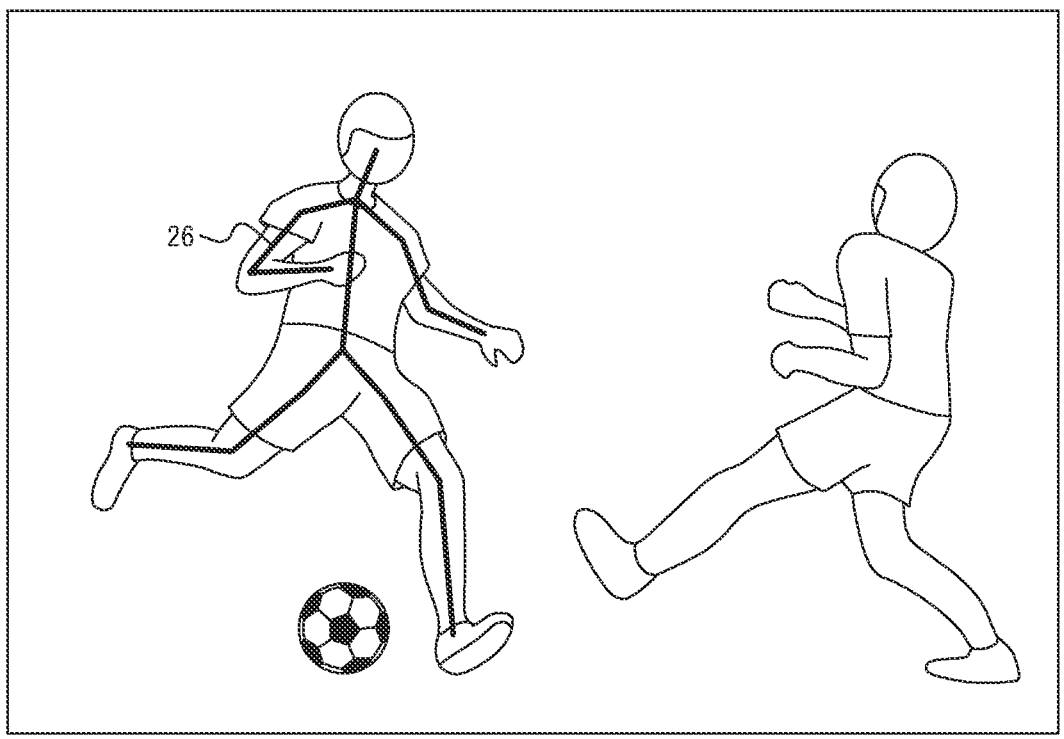
FIG. 4 shows an example of a video content that belongs to a first scene class.

In an example of FIG. 4, the video processing device, when the scene class information output as information for identifying the genre of the video content is "soccer", automatically selects a person to whom the largest movement vector is given among persons who are interacting with the ball and are likely to attract great attention, and a result of the estimation of coordinates of the skeletal structure (a skeletal structure 26 indicated by bold lines) of the person is shown. A movement vector determined from time-series data about coordinates of the skeletal structure of the person obtained in this way may be output as a movement vector for the video content.

Next, operation of the second movement information estimation unit 30, which is configured to estimate a movement vector of a target object from a video content classified into the second scene class, will be described in detail.

When a scene class based on scene class information output from the scene identification unit 10 is classified into the second scene class (absence of person in bird's-eye view video), the second movement information estimation unit 30 generates a movement vector from an input video content and outputs the movement vector.

Figure 5:
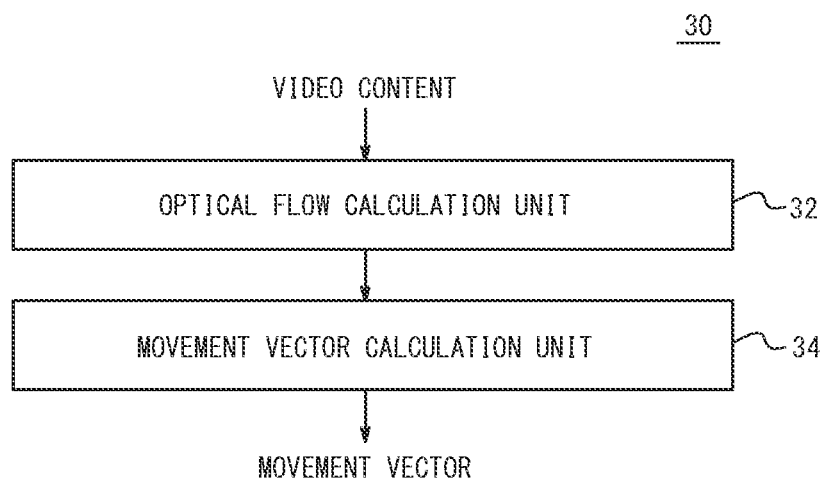
FIG. 5 is a block diagram illustrating a configuration of a second movement information estimation unit in FIG. 1.

As shown in FIG. 5, the second movement information estimation unit 30 includes an optical flow calculation unit 32 to calculate optical flow for a video content and a movement vector calculation unit 34 to calculate a movement vector from the calculated optical flow. To generate a movement vector from a video content, the optical flow calculation unit 32 calculates optical flow for the video content. The optical flow can be calculated by detecting optical flow using a generalized gradient method as shown, for example, in Reference Literature 3. The method used for optical flow calculation is not limited to this mode but may be any of various techniques such as the Lucas-Kanade method. Next, the movement vector calculation unit 34 outputs a representative value of the optical flow calculated across a whole or a part of a region of the video as a two-dimensional movement vector. When calculating the two-dimensional movement vector, the calculation unit can use, for example, an average of the optical flow.

(Reference Literature 3) Miike, Osa, Miura, and Sugimura, "Detecting Optical Flow with a Generalized Gradient Method: Measuring Object Motion under Non-uniform Illumination", Journal published by the Information Processing Society of Japan: Computer Vision and Image Media (CVIM) (2008)

When calculating the above-described optical flow, the movement information estimation unit may track a target object moving in a video using an object tracking technology, calculate optical flow from a video section in a region covering the target object and a vicinity of the target object, and output a representative value of the optical flow as a movement vector for the video content.

Figure 6:
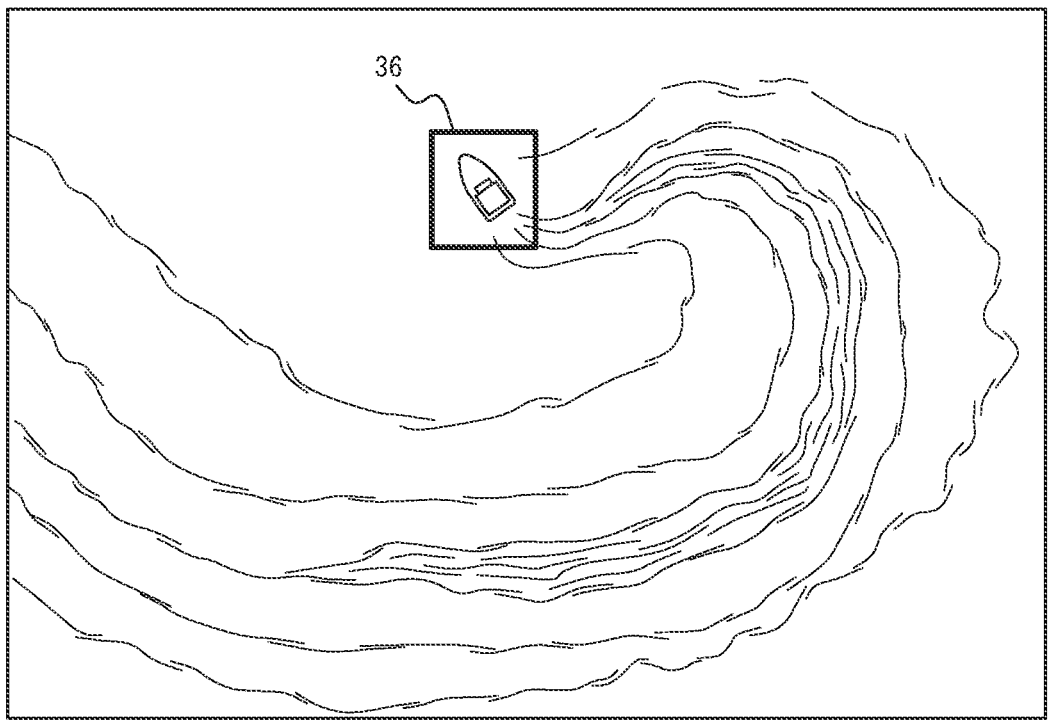
FIG. 6 shows an example of a video content that belongs to a second scene class.

FIG. 6 shows an example in which the movement information estimation unit tracks an aquatic boat, a target object moving in a video, using an object tracking technology and calculates optical flow from a video section in a region 36 covering the aquatic boat and a vicinity of the aquatic boat. If optical flow is calculated from a whole of the video, waves traveling in a direction have an influence on the optical flow, making it difficult to present the user with a force sense in response to movement of the aquatic boat. Meanwhile, calculating optical flow for the moving target object and the vicinity of the target object in this way makes it possible to output a movement vector of the target object to which the user is paying attention. Thus, this approach is presumably more suited to giving the user a real experience.

Examples of methods for selecting one of movement vectors determined for a plurality of target objects moving in a video content include (1) selecting a largest movement vector, (2) selecting a movement vector of a target object selected over the video content by an input device (e.g., a mouse), and (3) moving a haptic device or another similar device in accordance with movement of a target object the user wants to select and thereby selecting a movement vector of the target object that agrees in high degree with a movement vector corresponding to the movement of the haptic device input from the haptic device. The controller may be configured to select a target object to which the user is likely to pay great attention.

Next, operation of the third movement information estimation unit 40, which is configured to estimate a movement vector of a target object from a video content classified into the third scene class, will be described in detail.

When a scene class based on scene class information output from the scene identification unit 10 is classified into the third scene class (first-person video), the third movement information estimation unit 40 generates a movement vector from an input video content.

Figure 7:
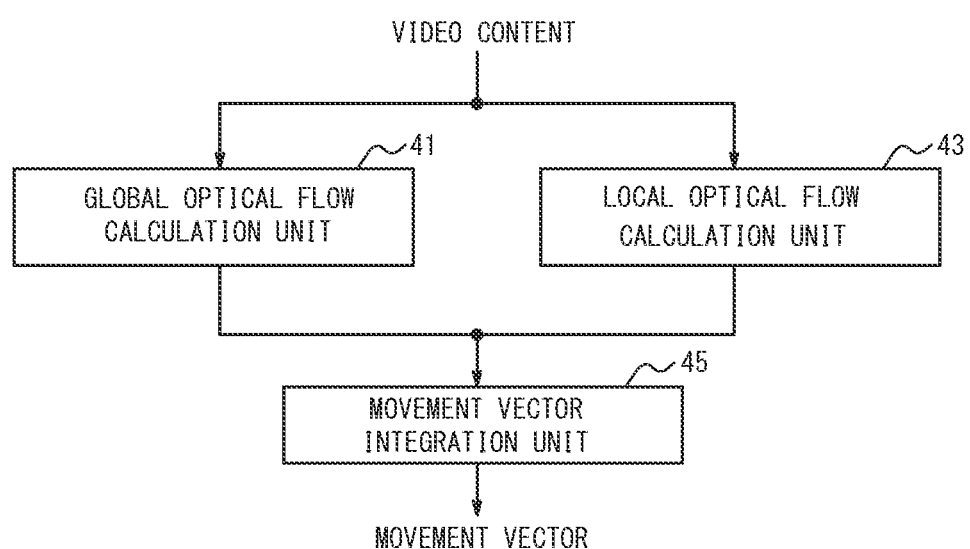
FIG. 7 is a block diagram illustrating a configuration of a third movement information estimation unit in FIG. 1.

FIG. 7 is a block diagram illustrating a schematic configuration of the third movement information estimation unit 40. The third movement information estimation unit 40 includes a global optical flow calculation unit 41 to calculate optical flow in a predetermined first region 47 (see FIG. 8) of an input video content of the third scene class, a local optical flow calculation unit 43 to calculate optical flow in a predetermined second region 48 (see FIG. 8), and a movement vector integration unit 45 to determine a weighted sum of a global movement vector output from the global optical flow calculation unit 41 and a local movement vector output from the local optical flow calculation unit 43 and output the determined weighted sum as a two-dimensional movement vector for the video content of the third scene class.

Figure 8:
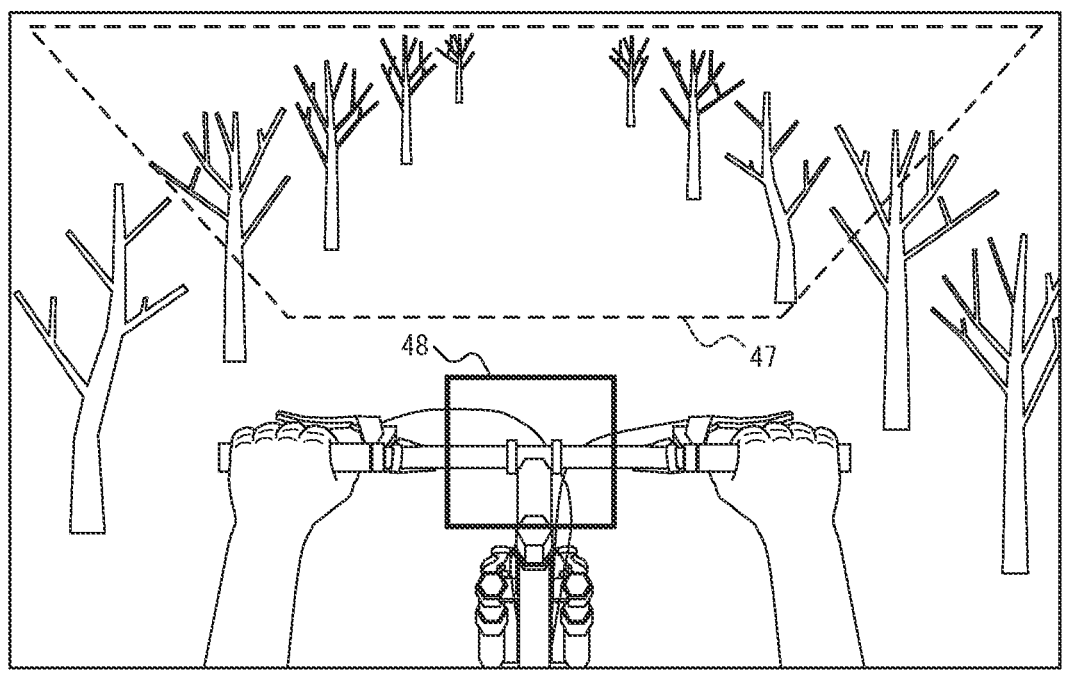
FIG. 8 shows an example of a video content that belongs to a third scene class.

As shown in FIG. 8, the first region 47 where the global optical flow calculation unit 41 calculates optical flow is a region larger in area than the second region 48 and is a region primarily reflecting a movement experienced by a photographer in a traveling direction, such as a surrounding scene in a video of the third scene class (a first-person video). For instance, in the case of a video, as shown in FIG. 8, that is filmed with a camera attached to a head of the photographer, a substantially upper half region of the video can be defined as the first region 47. The optical flow in the first region 47 can be calculated, in a similar way to the optical flow calculation unit 32 of the second movement information estimation unit 30, by detecting optical flow using a generalized gradient method as shown, for example, in Reference Literature 3. The first region 47 may be a predetermined region, such as a substantially upper half region of the video, that is defined in advance or may be specified by the user viewing the video with an external input device or another tool. The optical flow calculated by the global optical flow calculation unit 41 is hereinafter referred to as "global optical flow".

As shown in FIG. 8, the second region 48 where the local optical flow calculation unit 43 calculates optical flow is a region smaller in area than the first region 47, a zone where the above-described global optical flow calculation unit 41 calculates optical flow, and is a region primarily reflecting a movement experienced by the photographer in a direction other than the traveling direction in the video of the third scene class (the first-person video). For instance, in the case of the video, as shown in FIG. 8, which is filmed with the camera attached to the head of the photographer, the second region is a region surrounding an object that is contained in the video and that is reflected in every frame with a slight movement between the frames.

The second region 48 may be a predetermined region, such as a substantially lower half region of the video, that is defined in advance or may be specified by the user viewing the video with an external input device or another tool. The third movement information estimation unit 40 may be configured to automatically define the second region 48. For instance, the third movement information estimation unit 40 may include an object detector to detect an object from a video, identify an object with a slight movement between frames among the objects detected with the object detector, and use a region containing at least a region surrounding the identified object as the second region 48. The optical flow can be calculated by detecting optical flow using a generalized gradient method as shown, for example, in Reference Literature 3. The optical flow calculated by the local optical flow calculation unit 43 is hereinafter referred to as "local optical flow".

The movement vector integration unit 45 determines a weighted sum of a global movement vector obtained by a calculation of a representative value of the global optical flow in the entire first region 47 and a local movement vector obtained by a calculation of a representative value of the local optical flow in the entire second region 48, generates a two-dimensional movement vector for the video content of the third scene class (the first-person video) from the weighted sum and outputs the two-dimensional movement vector.

Weights assigned by the movement vector integration unit 45 to the global movement vector and the local movement vector can be freely determined in advance. If a sensation expected to be experienced by the photographer filming the video is desired to be reflected more strongly in a force sense presented to the user, the weight to the local movement vector is preferably set to be greater than the weight to the global movement vector. Meanwhile, if a sensation expected to be experienced by the photographer as a result of a movement in the traveling direction is desired to be reflected more strongly in a force sense presented to the user, the weight to the global movement vector is preferably set to be greater than the weight to the local movement vector.

A reason why the calculation of the movement vector for the video content of the third scene class, as described above, involves calculating global and local movement vectors separately and integrating these vectors is described below. The video content of the third scene class is a first-person video that is, for example, filmed with a camera attached to a head or another body part of a photographer traveling on a bicycle.

In this case, while the movement experienced by the photographer in the traveling direction is represented in the video as a change in surrounding scene, i.e., a global movement, the movement experienced by the photographer in a direction other than the traveling direction (e.g., vibrations experienced by the photographer) is represented in the video as a local movement in a region, for example, surrounding handlebars of the bicycle. Videos filmed with an event data recorder by a photographer traveling on an automobile are also video contents of the third scene class. In this case, a local movement is represented in a region, for example, surrounding a front pillar or a hood of the automobile.

In this way, when calculating a movement vector for a video content of the third scene class, the video processing device generates force sense control information to present a force sense to the user in consideration of integration of global and local movements and is thereby able to provide a more real force sense in conjunction with the movement in the video content.

In terms of integration taken into consideration, a case in which optical flow is calculated from an entire video can also be interpreted as generating a movement vector in consideration of integration of both a local movement and a global movement in the video. In this case, however, the movement vector is likely to be excessively smoothed in accordance with a ratio between areas of regions containing the global and local movements, respectively. Meanwhile, the video processing device defines regions where movements are calculated in advance and adjust weights assigned to vectors in the regions to provide a more real force sense.

The force sense information generation unit 50 receives input on the two-dimensional movement vector generated by any one of the first movement information estimation unit 20, the second movement information estimation unit 30, and the third movement information estimation unit 40 in response to the scene class of the video content and generates and outputs force sense control information, which is information used to control a direction and a magnitude of force presented by the haptic device to the user.

In the present embodiment, the haptic device is assumed to be a device that presents tractive force of a predetermined direction and a magnitude as disclosed, for example, in Patent Literature 1. However, the haptic device is not limited to this mode but may be a device of any other form capable of presenting a force sense to the user. For instance, the device in Patent Literature 1 lets the user sense pseudo-tractive force. However, application of the present technique is not limited to the pseudo-force sense. The present technique can be applied to even a device that presents a force sense to provide actual traction in a predetermined direction.

As shown in FIG. 9, the force sense information generation unit 50 includes a pre-trained coordinate transformation model 52 to convert the two-dimensional movement vector on a video plane that is input from the estimation unit into a movement vector on a plane coordinates system for the haptic device and a force sense control information generation unit 54 to determine a traction direction and a traction magnitude presented by the haptic device, from the movement vector on the plane coordinates system for the haptic device that is output from the pre-trained coordinate transformation model 52, i.e., force sense control information, and output the force sense control information.

The pre-trained coordinate transformation model 52 is a model that has trained by machine learning to receive input on the movement vector on the video plane and output a movement vector on the plane coordinates system for the haptic device. The machine learning described above involves, for example, preparing training data that is an assemblage of pairs of movement vectors on the video plane for learning and movement vectors on the plane coordinates system for the haptic device for learning and inputting the movement vectors on the video plane for learning in a neural network that is provided in advance with an appropriate initial value to obtain estimated movement vectors on the plane coordinates system for the haptic device. To cause the estimated movement vectors to approach the corresponding movement vectors, i.e., the movement vectors on the plane coordinates system for the haptic device for learning, in response to comparisons between the estimated movement vectors and the corresponding movement vectors, parameters in the neural network are repeatedly updated to let the model learn the training data.

In other words, the pre-trained coordinate transformation model 52 is a model that has learned a relationship between movement vectors on the video plane and movement vectors on the plane coordinates system for the haptic device and that is configured to receive input on a movement vector on the video plane, make a conversion into a movement vector on the plane coordinates system for the haptic device corresponding to the movement vector on the video plane and output the corresponding movement vector.

The movement vectors on the plane coordinates system for the haptic device for learning can be generated, for example, by letting an instructor instruct force senses desired to be presented to the user with an input device while allowing the instructor to view movement of a target object in a video content and detecting movement vectors of the input device input by the instructor. The input device used here is a device that is similar in posture to the haptic device held and used by the user and that is equipped with a sensor for measuring movement directions and amounts. This is intended to intuitively generate data about correct-answer information of movement vectors by moving the input device in directions and magnitudes of the force senses desired to be presented.

In the present embodiment, the force sense information generation unit includes the pre-trained coordinate transformation model 52 to generate a movement vector on the plane coordinates system for the haptic device from a two-dimensional movement vector on the video plane. However, movement vector generation is not limited to this mode. The force sense information generation unit may be configured to generate a movement vector on the plane coordinates system for the haptic device from a two-dimensional movement vector on the video plane by a geometrical coordinate transformation.

The force sense control information generation unit 54 determines a traction direction and a traction magnitude presented by the haptic device, from the movement vector on the plane coordinates system for the haptic device that is output from the pre-trained coordinate transformation model 52, i.e., force sense control information, and outputs the force sense control information. Force sense control information for the haptic device can be computed from the movement vector on the plane coordinates system for the haptic device, for example, by first-order differentiating the movement vector, a vector of movement velocity, with respect to time to compute a vector of movement acceleration and determining a traction direction and a traction magnitude presented by the haptic device based on the vector of movement acceleration.

With reference to FIG. 1, processes by the scene identification unit 10, the movement information estimation units 20, 30, 40, the force sense information generation unit 50, and the controller 70 can be implemented as software processes, for example, by allowing a central processing unit (CPU) or a digital signal processor (DSP) included in the video processing device 100 to execute predetermined programs. However, process execution is not limited to this mode. The processes by the functional units may be implemented as hardware processes, for example, by an application-specific integrated circuit (ASIC), a programmable logic device (PLD), a field-programmable gate array (FPGA), or other hardware.

The predetermined programs described above are stored in a storage unit (not shown) that is in the video processing device 100 or that is disposed externally. The storage unit includes a readable non-transiently recording medium. Examples of such a recording medium include magnetic disk storage media, magnetic recording cassettes, magnetic tapes, and other magnetic or optical storage units (e.g., compact discs (CD), LaserDisc (registered trademark), Digital Versatile Disc (DVD, registered trademark), floppy (registered trademark) disks, and Blu-ray Disc (registered trademark)), rewritable programmable read-only memory (ROM) such as erasable programmable read-only memory (EPROM), electrically erasable programmable read-only memory (EEPROM), and flash memory, and other tangible storage media capable of storing information, as well as a combination of any of these recording media.

With reference to FIG. 10, steps involved in a video processing method according to the present embodiment will now be described.

First, the scene identification unit 10 of the video processing device 100, in response to input on a video content, estimates scene class information for the video content and outputs the scene class information by the pre-trained scene identification model 12 (step S101).

The controller 70 of the video processing device 100, based on a scene class identified by the scene class information from the scene identification unit 10, selects one movement information estimation unit corresponding to the scene class from the first movement information estimation unit 20, the second movement information estimation unit 30, and the third movement information estimation unit 40 (step S103). The controller 70 selects the first movement information estimation unit 20 if the scene class of the video content is the first scene class (presence of person in bird's-eye view video), selects the second movement information estimation unit 30 if the scene class of the video content is the second scene class (absence of person in bird's-eye view video), and selects the third movement information estimation unit 40 if the scene class of the video content is the third scene class (first-person video).

The controller 70 enables the one movement information estimation unit selected in the step S103 to process the video content and estimate a movement vector of the target object in the video (step S105).

The estimated movement vector output in the step S105 is input in the force sense information generation unit 50. The force sense information generation unit 50 lets the two-dimensional movement vector on the video plane input in the pre-trained coordinate transformation model 52, which has learned a relationship between two-dimensional movement vectors on the video plane and movement vectors on the plane coordinates system for the haptic device, to generate a movement vector on the plane coordinates system for the haptic device. The force sense control information generation unit 54 converts the generated movement vector on the plane coordinates system for the haptic device into force sense control information to be supplied to the haptic device and outputs the force sense control information (step S107).

As described above, the video processing device 100 according to the present embodiment is a video processing device 100 that generates a movement vector for a video content. The video processing device 100 includes the scene identification unit 10 to estimate scene class information, information identifying a scene class for the video content, from the video content, and the plurality of the movement information estimation units 20, 30, and 40 to estimate a movement vector from the video content. One movement information estimation unit that is selected from the plurality of the movement information estimation units 20, 30, and 40 in response to the scene class identified by the scene class information estimates the movement vector. This configuration enables the video processing device to switch between the movement information estimation units 20, 30, and 40 in response to the scene class of the video content and use the movement information estimation unit for estimating the movement vector. Thus, the video processing device can select an appropriate technique for calculating the movement vector in accordance with a characteristic of the video content and focus on one of different regions in accordance with the characteristic of the video content when calculating the movement vector. This enables the video processing device to appropriately calculate the movement vector in accordance with the characteristic of the content and provide video processing information to a haptic device or another similar device.

In the present embodiment, the scene class is a class defined in accordance with at least one of information identifying the viewpoint of filming the video content, information identifying presence or absence of the specific target object or the number of the specific target objects in the video content, and information identifying the genre of the video content. The video processing device includes the movement information estimation units 20, 30, and 40 that estimate movement vectors by different techniques for the respective scene classes. Thus, in accordance with the characteristic of the video content, the video processing device is able to select one of the movement information estimation units 20, 30, and 40 (movement information estimation techniques) that is more suited to estimating the movement vector for the video content.

In the present embodiment, the scene identification unit 10 is configured to estimate scene class information using the pre-trained scene identification model 12, which has learned a relationship between video contents and information on scene classes in advance. This configuration provides improved precision with which to estimate scene class information from the video content. Thus, the video processing device is able to select a calculation technique more suited to estimating a movement vector for the video content from the plurality of the movement information estimation units 20, 30, and 40 to estimate the movement vector.

In the present embodiment, the scene classes include at least a class representing a first-person viewpoint video, a class representing a bird's-eye view video that contains a person, and a class representing a bird's-eye view video that contains no person. This configuration enables the video processing device to select, in accordance with the characteristic of the video content, one of the movement information estimation units 20, 30, and 40 (movement information estimation techniques) that is more suited to estimating the movement vector for the video content.

In the present embodiment, when the scene class identified by the scene class information represents a bird's-eye view video that contains a person, the selected one movement information estimation unit estimates coordinates of a skeletal structure of a person contained in the video content in response to input on the video content, calculates movement vectors for the coordinates of the skeletal structure using time-series data about the estimated coordinates of the skeletal structure of the person, and outputs a representative value of the movement vectors for the coordinates of the skeletal structure as a movement vector for the video content. This configuration, if the video content contains a person, enables the video processing device to estimate a movement vector of the person using a technology such as a person pose estimation device suited to estimating a movement vector of a person. This provides further improved precision with which to estimate the movement vector from the video content.

In the present embodiment, when the scene class identified by the scene class information represents a bird's-eye view video that contains no person, the selected one movement information estimation unit calculates optical flow for the input video content and outputs a representative value of the optical flow as a movement vector for the video content. This configuration, if the video content represents a bird's-eye view video where a person, i.e., a specific target object, is absent, enables the video processing device to calculate optical flow in the video content and thereby provide further improved precision with which to estimate the movement vector.

In the present embodiment, the one movement information estimation unit that is selected when the scene class identified by the scene class information represents a first-person viewpoint video includes: the global optical flow calculation unit 41 to calculate optical flow in the first region 47 of the input video content, the first region reflecting a movement experienced by a photographer in a traveling direction; the local optical flow calculation unit 43 to calculate optical flow in the second region 48 of the input video content, the second region reflecting a movement experienced by the photographer in a direction other than the traveling direction; and the movement vector integration unit 45 to determine a weighted sum of a representative value of the optical flow in the first region 47 and a representative value of the optical flow in the second region 48 and output the determined weighted sum as a movement vector for the video content. This configuration enables the video processing device to estimate the movement vector for the video content in consideration of integration of global and local movements typical of first-person videos and thereby provide a more real force sense in conjunction with the movement in the video content. This configuration encourages a preference of the user, i.e., which of a sensation experienced by the photographer filming the video and a sensation experienced by the photographer as a result of a movement in the traveling direction is to be reflected more strongly in a force sense, to be reflected in the haptic device.

In the present embodiment, the video processing device includes the force sense information generation unit 50 to generate force sense control information from the movement vector to drive the haptic device. This configuration enables the video processing device to generate force sense control information from the movement vector of the target object that is estimated from the video content and provide the force sense control information to the haptic device.

The video processing method according to the present embodiment includes the steps of: estimating scene class information that is information identifying a scene class for a video content; selecting one movement information estimation unit based on the estimated scene class information from the plurality of the movement information estimation units 20, 30, and 40; and enabling the one movement information estimation unit to estimate a movement vector from the video content. This configuration enables the video processing device to switch between the movement information estimation units 20, 30, and 40 in response to the scene class of the video content and use the movement information estimation unit for estimating the movement vector. Thus, the video processing device can select an appropriate technique for calculating the movement vector in accordance with a characteristic of the video content and focus on one of different regions in accordance with the characteristic of the video content when calculating the movement vector. This enables the video processing device to appropriately calculate the movement vector in accordance with the characteristic of the content and provide video processing information to a haptic device or another similar device.

A video processing program according to the present embodiment is a video processing program allowing a computer to function as any mode of the video processing device 100 described above. This configuration enables the video processing device to switch between the movement information estimation units 20, 30, and 40 in response to the scene class of the video content and use the movement information estimation unit for estimating the movement vector. Thus, the video processing device can select an appropriate technique for calculating the movement vector in accordance with a characteristic of the video content and focus on one of different regions in accordance with the characteristic of the video content when calculating the movement vector. This enables the video processing device to appropriately calculate the movement vector in accordance with the characteristic of the content and provide video processing information to a haptic device or another similar device.

A video processing device 200 according to a second embodiment of the present disclosure will now be described. The video processing device 200 according to the second embodiment differs from the video processing device according to the first embodiment in estimating a three-dimensional movement vector rather than a two-dimensional movement vector from a video content and generating force sense control information for a haptic device from the estimated movement vector. Differences between the second embodiment and the first embodiment will be primarily described below.

The video processing device 200 according to the embodiment has a configuration shown by the block diagram in FIG. 1 in a similar way to the first embodiment and, however, differs from the first embodiment in estimating a three-dimensional movement vector from a video content. In other words, in the present embodiment, a first movement information estimation unit 20, a second movement information estimation unit 30, and a third movement information estimation unit 40 are each able to estimate a three-dimensional movement vector by further estimating a translation vector in a depth direction in addition to a two-dimensional movement vector from a video content by a three-dimensional geometry reconstruction technique as shown, for example, in Reference Literature 4. The movement information estimation units may be configured to each estimate a movement in three rotational degrees of freedom as well as three translational degrees of freedom from the video content and output the estimated movement.

(Reference Literature 4) N. Snavely, S. M. Seitz, and R. Szeliski, "Photo Tourism: Exploring image collections in 3D", ACM Transactions on Graphics (2006)

A force sense information generation unit 50 receives input on the three-dimensional movement vector generated by any one of the movement information estimation units 20, 30, and 40 and generates and outputs force sense control information, which is information used to control a direction and a magnitude of force presented by the haptic device to the user. The present embodiment uses the haptic device capable of providing a force sense in three translational degrees of freedom or in three translational degrees of freedom and three rotational degrees of freedom to enable the user to experience a more real force sense.

The present disclosure has been described based on the drawings and examples. It is to be noted that those skilled in the art can readily make various modifications and alterations based on the present disclosure. Accordingly, it should be noted that these modifications and alterations are also included within the scope of the present invention. For instance, elements such as functions included in the components or the steps can be reallocated without logical inconsistency. A plurality of the components or the steps may be combined into one or may be divided.

In the first and second embodiments, the video processing devices 100 and 200 each include all the scene identification unit 10, the first movement information estimation unit 20, the second movement information estimation unit 30, the third movement information estimation unit 40, the force sense information generation unit 50, and the controller 70, for example. The configuration, however, is not limited to this mode. For instance, the scene identification unit 10, the first movement information estimation unit 20, the second movement information estimation unit 30, the third movement information estimation unit 40, and the controller 70 may be implemented by executing programs on a personal computer (PC), a smartphone or a tablet PC, and the force sense information generation unit 50 may be disposed in the haptic device. The scene identification unit 10, the first movement information estimation unit 20, the second movement information estimation unit 30, the third movement information estimation unit 40, and the controller 70 may be implemented by executing programs on a server, and the force sense information generation unit 50 may be disposed in a PC, a smartphone, a tablet PC or in the haptic device. The video processing device 100 may be disposed in any apparatus such as a server, a PC, a smartphone, a tablet PC, or the haptic device.

In the first and second embodiments, the video processing devices 100 and 200 calculate optical flow for video contents classified into either of the second scene class and the third scene class to estimate movement vectors for the video contents. Movement vector estimation, however, is not limited to this mode. The video processing devices 100 and 200 may generate movement vectors using a technique other than the optical flow calculation.

In the first and second embodiments, the first region 47 where global optical flow is calculated is a region larger in area than the second region 48 where local optical flow is calculated, and a substantially upper half region of the video is defined as the first region 47. The configuration of these regions, however, is not limited to this mode. Either of an area size relationship and a vertical position relationship between the first region 47 and the second region 48 may be changed depending on the position of a camera filming the video content, the type of a conveyance to which the camera is attached, or other factors.

REFERENCE SIGNS LIST

10 scene identification unit
12 pre-trained scene identification model
20 first movement information estimation unit
22 pre-trained first movement information estimation model
24 movement vector calculation unit
26 skeletal structure
30 second movement information estimation unit
32 optical flow calculation unit
34 movement vector calculation unit
36 region 40 third movement information estimation unit
41 global optical flow calculation unit
43 local optical flow calculation unit
45 movement vector integration unit
47 first region
48 second region
50 force sense information generation unit
52 pre-trained coordinate transformation model
54 force sense control information generation unit
70 controller
100, 200 video processing device

The invention claimed is:

1. A video processing device that generates a movement vector for a video content, the video processing device comprising processing circuitry configured to:
   estimate scene class information from the video content, the scene class information being information identifying a scene class for the video content; and
   perform one of a plurality of movement information estimations to estimate a movement vector from the video content,
   wherein one movement information estimation that is selected from the plurality of the movement information estimations in response to the scene class identified by the scene class information is performed to estimate the movement vector; and
   wherein the scene classes include at least a class representing a first-person viewpoint video, a class representing a bird's-eye view video that contains a person, and a class representing a bird's- eye view video that contains no person.

2. The video processing device according to claim 1, wherein the scene class is defined in accordance with at least one of information identifying a viewpoint of filming the video content, information identifying presence or absence of a specific target object or a number of the specific target objects in the video content, and information identifying a genre of the video content.

3. The video processing device according to claim 1, wherein the processing circuitry estimates the scene class information using a pre-trained scene identification model that has learned a relationship between the video content and the scene class information in advance.

4. The video processing device according to claim 1, wherein when the scene class identified by the scene class information represents a bird's-eye view video that contains a person, the selected one movement information estimation is performed to estimate coordinates of a skeletal structure of a person contained in the video content in response to input on the video content, calculate movement vectors for the coordinates of the skeletal structure using time-series data about the estimated coordinates of the skeletal structure of the person, and output a representative value of the movement vectors for the coordinates of the skeletal structure as a movement vector for the video content.

5. The video processing device according to claim 1, wherein when the scene class identified by the scene class information represents a bird's-eye view video that contains no person, the selected one movement information estimation is performed to calculate optical flow for the input video content and output a representative value of the optical flow as a movement vector for the video content.

6. The video processing device according to claim 1, wherein the one movement information estimation that is selected when the scene class identified by the scene class information represents a first-person viewpoint video is performed to:
   calculate optical flow in a first region of the input video content, the first region reflecting a movement experienced by a photographer in a traveling direction;
   calculate optical flow in a second region of the input video content, the second region reflecting a movement experienced by the photographer in a direction other than the traveling direction; and
   determine a weighted sum of a representative value of the optical flow in the first region and a representative value of the optical flow in the second region and output the determined weighted sum as a movement vector for the video content.

7. The video processing device according to claim 1, wherein the processing circuitry is configured to generate force sense control information from the movement vector to drive a haptic device.

8. A video processing method comprising:
   estimating scene class information that is information identifying a scene class for a video content;
   selecting one movement information estimation based on the estimated scene class information from a plurality of movement information estimations; and
   performing the one movement information estimation to estimate a movement vector from the video content; and
   wherein the scene classes include at least a class representing a first-person viewpoint video, a class representing a bird's-eye view video that contains a person, and a class representing a bird's- eye view video that contains no person.

9. A non-transitory computer readable recording medium storing a video processing program allowing a computer to function as the video processing device according to claim 1.

* * * * *